(12) United States Patent
Fritsch et al.

(10) Patent No.: US 6,801,394 B2
(45) Date of Patent: Oct. 5, 2004

(54) CLEANING DEVICE FOR TREATING THE VIDEO HEAD AND/OR ROTATING DRUM OF A VIDEO RECORDER AND/OR PLAYBACK UNIT

(76) Inventors: Joseph Frederick Fritsch, 21 The Sweepstakes, Ballsbridge, Dublin 4 (IE); Roxanne Yvonne Fritsch, 21 The Sweepstakes, Ballsbridge, Dublin 4 (IE)

( * ) Notice: Subject to any disclaimer, the term of this patent is extended or adjusted under 35 U.S.C. 154(b) by 0 days.

(21) Appl. No.: 10/169,574
(22) PCT Filed: Jan. 4, 2001
(86) PCT No.: PCT/IE01/00001
§ 371 (c)(1), (2), (4) Date: Nov. 8, 2002
(87) PCT Pub. No.: WO01/50470
PCT Pub. Date: Jul. 12, 2001

(65) Prior Publication Data
US 2003/0128966 A1 Jul. 10, 2003

(30) Foreign Application Priority Data
Jan. 5, 2000 (IE) .......................................... S2000/0008

(51) Int. Cl.⁷ ............................................... G11B 5/41
(52) U.S. Cl. ...................................................... 360/128
(58) Field of Search ............................... 360/128, 132, 360/85, 95

(56) References Cited

U.S. PATENT DOCUMENTS

| | | | |
|---|---|---|---|
| 4,761,700 A | * | 8/1988 | Fritsch ........................ 360/128 |
| 5,173,827 A | * | 12/1992 | Boshek, Jr. ................. 360/128 |
| 5,309,307 A | * | 5/1994 | Fritsch et al. ............... 360/128 |
| 5,341,257 A | * | 8/1994 | Dienbauer ................... 360/85 |
| 5,461,529 A | * | 10/1995 | Clausen ...................... 360/128 |
| 5,856,900 A | * | 1/1999 | Fritsch et al. ............... 360/128 |
| 5,949,629 A | * | 9/1999 | Suzuki et al. ............... 360/128 |
| 6,028,751 A | * | 2/2000 | Fritsch et al. ............... 360/128 |

FOREIGN PATENT DOCUMENTS

| | | | |
|---|---|---|---|
| BE | 891 096 A | * | 3/1982 |
| EP | 210 787 A2 | * | 2/1987 |
| EP | 439 375 A2 | * | 7/1991 |
| JP | 58-45621 A | * | 3/1983 |
| JP | 59-63020 A | * | 4/1984 |
| JP | 3-241512 A | * | 10/1991 |

* cited by examiner

Primary Examiner—Jefferson Evans
(74) Attorney, Agent, or Firm—Sughrue Mion, PLLC

(57) ABSTRACT

A cleaning device (1) for cleaning a video head and drum of a video recorder and/or playback unit comprises a housing (6) within which a carrier arm (28) is pivotally mounted and carries a cleaning brush (29) and is pivotal from a retracted position (28) within the housing (6) to a treating position with the cleaning brush (29) in cleaning engagement with the drum (2) under the action of a torsion spring (33). A retaining rib (48) extending inwardly from a lid (20) of the housing (6) acts on the cleaning brush (29) for retaining the carrier arm (28) and the cleaning brush (29) in the retracted position. An abutment edge (50) on the carrier arm (28) is positioned so that as the housing (6) is being lowered into a cassette receiving area (5) of the video recorder and/or playback unit, the abutment edge (50) is located behind a tape withdrawal roller (3) prior to the retaining rib (48) disengaging the cleaning brush (29). Accordingly, the carrier arm (28) and the cleaning brush (29) are retained in the retracted position by the tape withdrawal roller (3) until the tape withdrawal roller (3) commences to move outwardly of the cassette receiving area (5), thus preventing any danger of the carrier arm and cleaning brush becoming entangled with the tape withdrawal roller (3) or any other tape withdrawal rollers until the tape withdrawal rollers have moved outwardly of the cassette receiving area (5).

20 Claims, 9 Drawing Sheets

Figure 1:
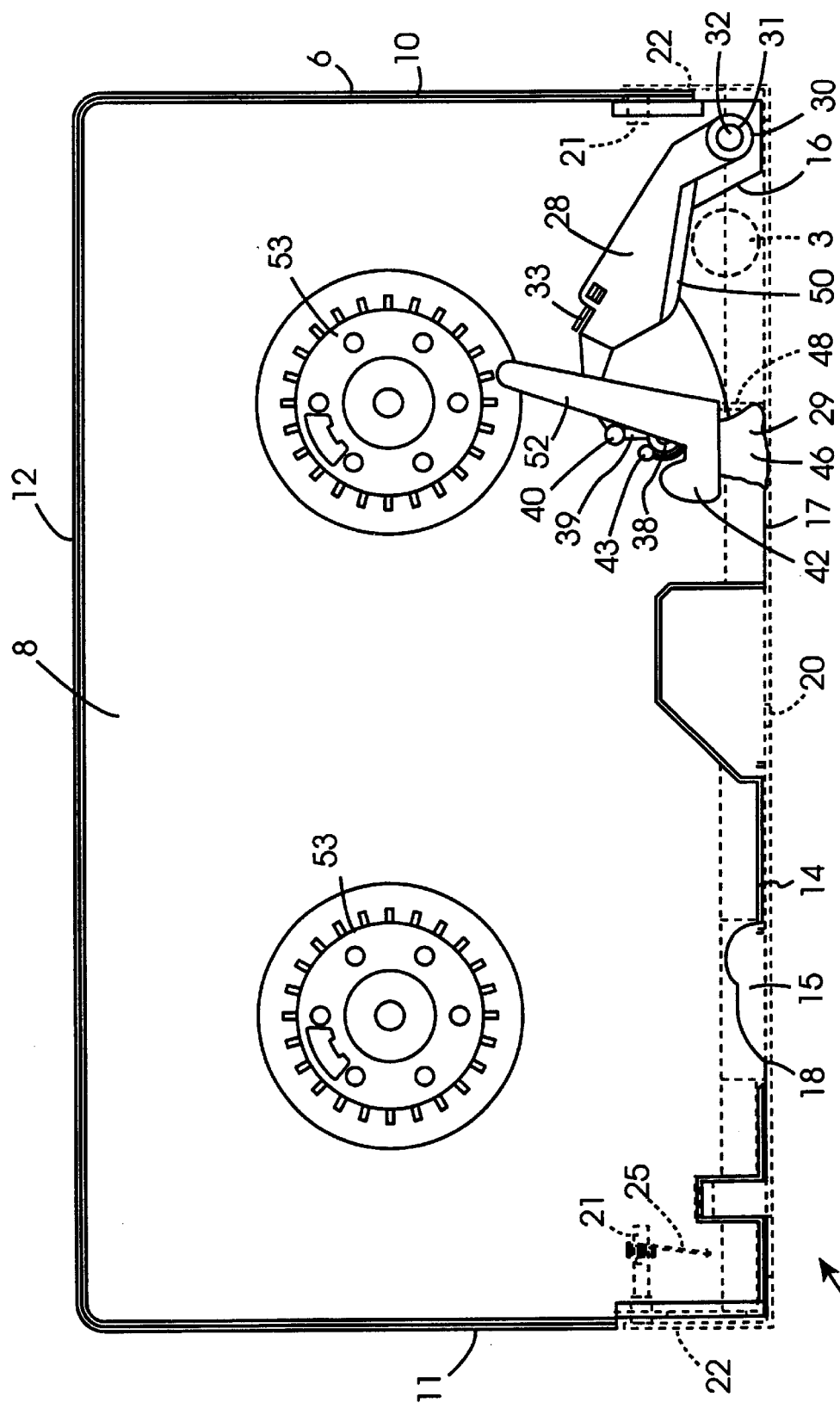

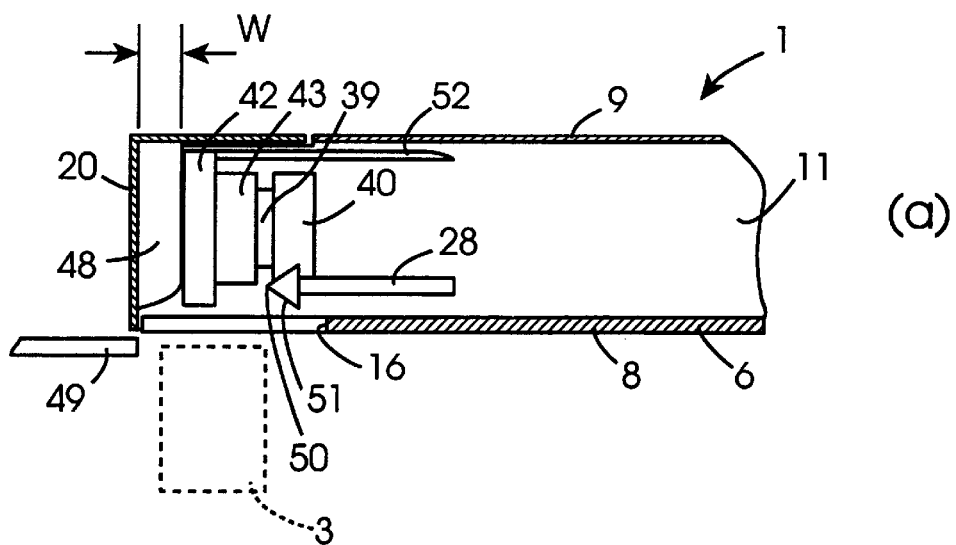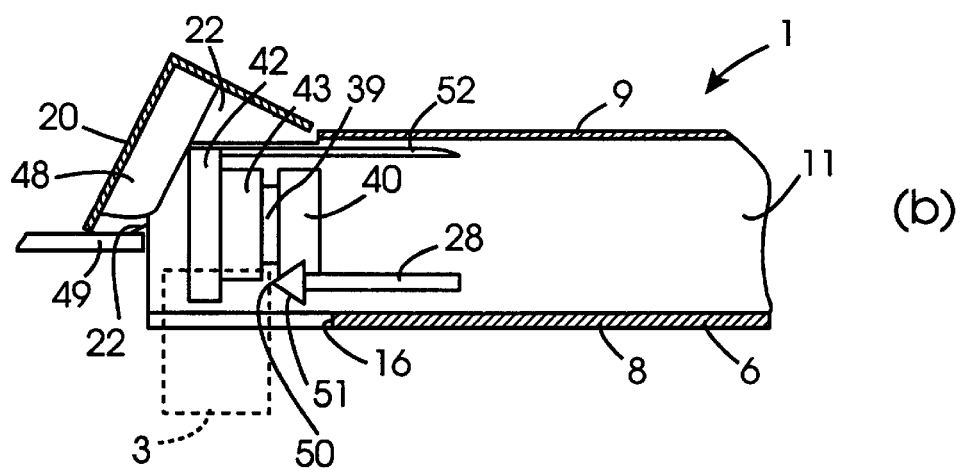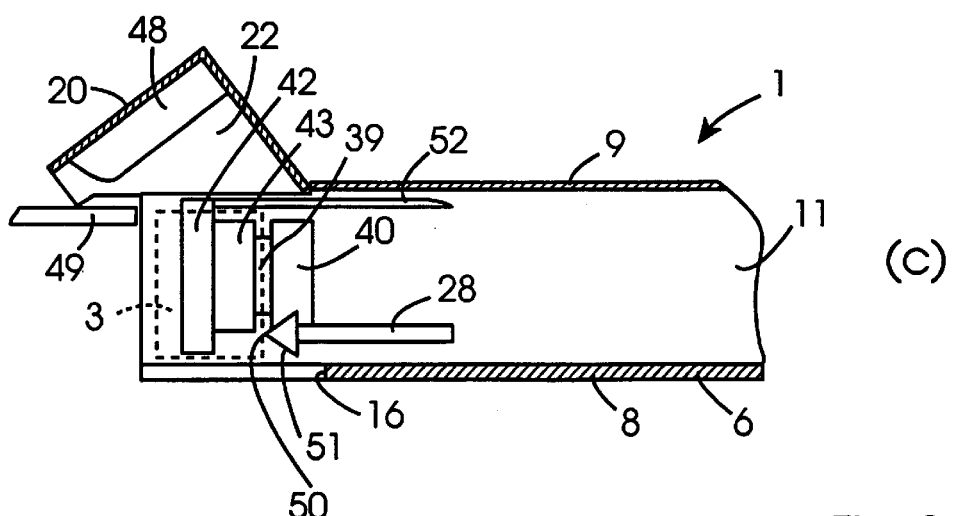
Fig. 8

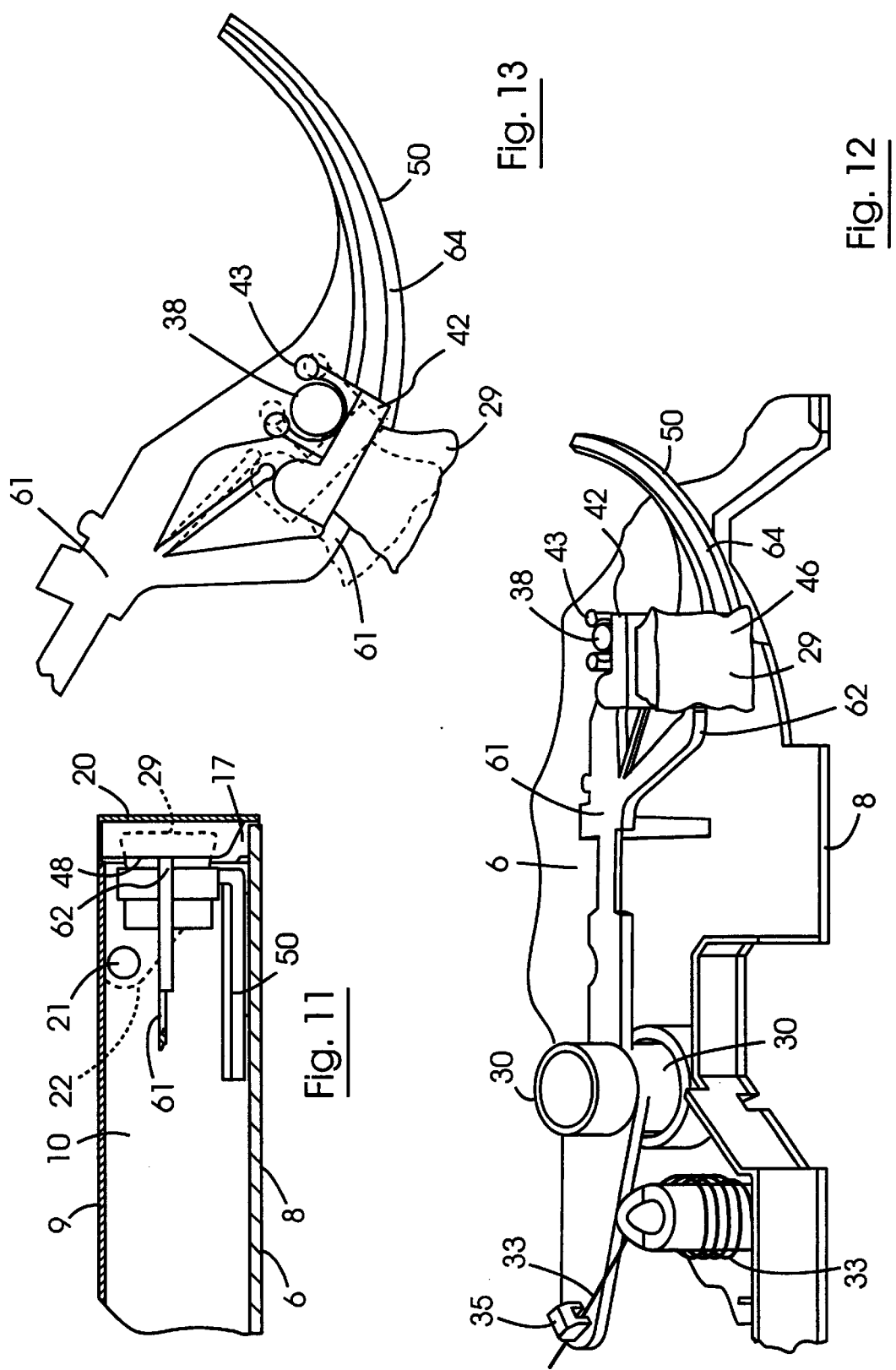

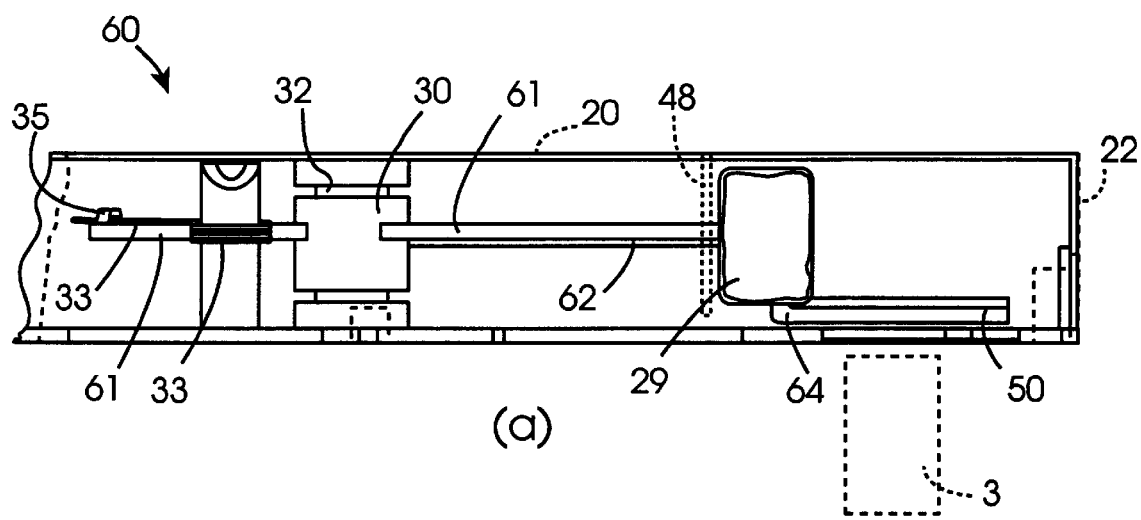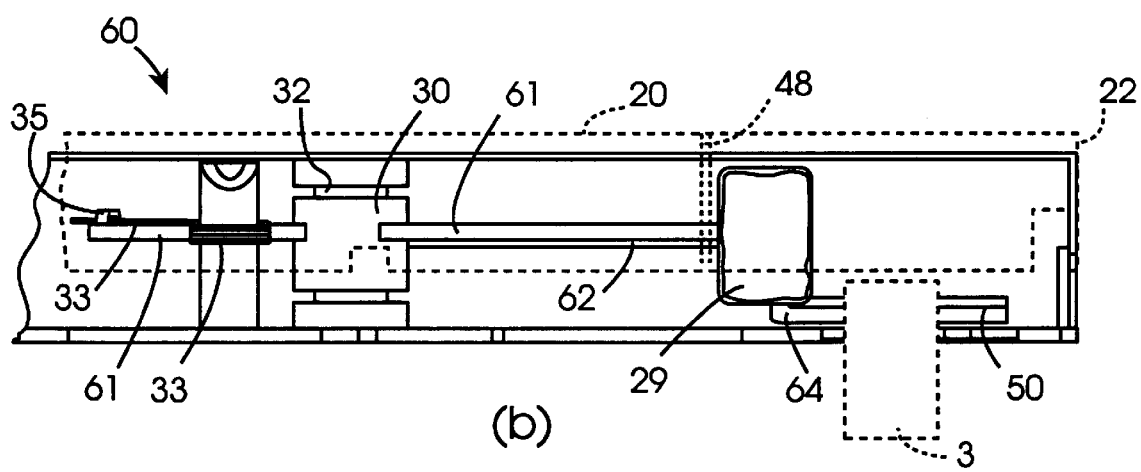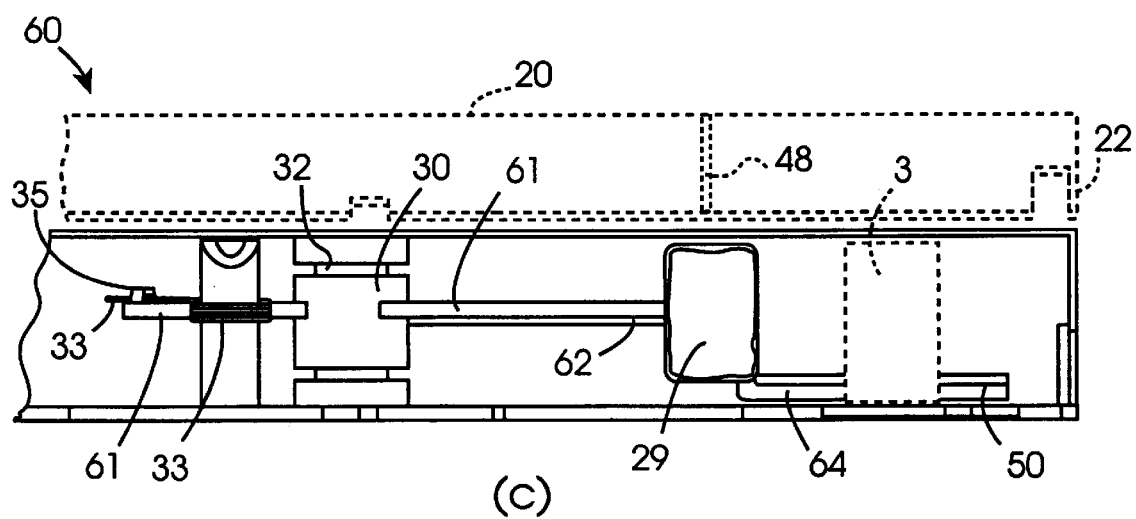
Fig. 14

CLEANING DEVICE FOR TREATING THE VIDEO HEAD AND/OR ROTATING DRUM OF A VIDEO RECORDER AND/OR PLAYBACK UNIT

This is a National Stage entry of PCT/IE01/00001, with an international filing date of Jan. 4, 2001, the complete disclosure of which is incorporated into this application by reference.

The present invention relates to a treating device for treating the video head and/or rotating drum of a video recorder and/or playback unit, and in particular, though not limited to a treating device for cleaning the video head and/or rotating drum. The invention also relates to a method for treating a video head and/or drum of a video recorder and/or playback unit.

Treating devices for treating a video head and/or drum of a video recorder and/or playback unit are known. Typically, such treating devices are provided for cleaning the video head and/or drum. In general, they comprise a cassette housing which is substantially identical to a video cassette housing of the type which houses a video magnetic tape. A cleaning brush typically is carried on a carrier arm which is pivotally mounted within the cassette housing and is pivotal from a retracted position within the housing to a cleaning position with the cleaning brush in engagement with the drum.

One such cleaning device is disclosed in European Patent Specification No. 0,210,787. The cleaning device disclosed in this European specification comprises a cassette housing. A carrier arm which is located within the housing carries a cleaning brush for cleaning the video head and drum. A cleaning tape is wound onto a pair of spools in the housing in substantially similar fashion as a magnetic tape is wound onto the corresponding spools in a video tape cassette. The cleaning tape has a number of functions, one of which is to clean the video head and drum as well as other components such as the sound and erase heads in the normal tape path through a video recorder and/or playback unit. Another function of the cleaning tape is to urge the cleaning brush into cleaning engagement with the video head and drum.

Another cleaning device for cleaning a video head and/or drum of a video recorder and/or playback unit is disclosed in European Patent Specification No. 0,439,375. The cleaning device of this European specification also comprises a cassette housing which is substantially similar to a video tape cassette housing. In this cleaning device cleaning of the video head and drum is exclusively carried out by a cleaning brush which is carried on a carrier arm. A drive mechanism is provided in the cassette housing for urging the carrier arm from a retracted position with the carrier arm and the cleaning brush located within the cassette housing and a cleaning position with the cleaning brush in cleaning engagement with the video head and drum. A timing mechanism is also provided within the cassette housing for controlling the drive mechanism for preventing the drive mechanism urging the carrier arm and cleaning brush from the retracted to the cleaning position, until tape withdrawal rollers for withdrawing a magnetic tape from a video tape cassette into engagement with the drum have moved from the cassette receiving area for avoiding any danger of the carrier arm and/or cleaning brush becoming entangled with the rollers. The timing mechanism also ensures that the carrier arm and the cleaning brush are urged from the cleaning position to the retracted position in advance of the tape withdrawing rollers returning to the cassette receiving area, similarly for preventing entanglement of the carrier arm and brush with the tape withdrawal rollers.

In the cleaning device disclosed in European specification No. 0,210,787, the fact that the cleaning tape is adapted for urging the carrier arm and the cleaning brush from the retracted position to the cleaning position under the action of the tape withdrawal rollers avoids the danger of the cleaning brush and carrier arm becoming entangled with the tape withdrawal rollers.

It is essential that the parts of a cleaning device for cleaning a video head and/or a drum of a video recorder and/or playback unit should not become entangled with the tape withdrawal rollers. Such tape withdrawal rollers are mounted on carrier arms, and the carrier arms are driven by a drive mechanism for urging the tape withdrawal rollers for urging the magnetic tape from the video tape cassette into engagement with the drum. The drive mechanism and indeed the carrier arms which carry the tape withdrawal rollers are highly precision engineered, and in general, are relatively delicate components. Thus, if subjected to any undue resistance to their movement either for withdrawing or returning a magnetic tape from or to a video tape cassette, the tape withdrawal rollers could easily be put out of adjustment. Indeed, if the resistance to their movement is excessive the carrier arms and drive mechanism could be damaged. Accordingly, it is essential that there should be no danger of any part of a cleaning device, and in particular, a cleaning brush or other treating means, and its associated carrier arm becoming entangled with the tape withdrawal rollers.

The cleaning devices disclosed in European specifications Nos. 0,210,787 and 0,439,375 achieve this objective. However, in the cleaning device of European Specification No. 0,439,375 the timing mechanism is required in order to control the drive means which urges the carrier arm and in turn the cleaning brush into the cleaning position. Such timing mechanisms tend to be relatively expensive. The objective of avoiding entanglement of the cleaning brush and carrier arm with the tape withdrawal rollers is achieved in the cleaning device of European Patent Specification No. 0,210,787 by virtue of the fact that the cleaning brush and carrier arm are moved into the cleaning position by the cleaning tape, which itself is urged by the tape withdrawal rollers. However, in certain cases it is desirable to provide a cleaning device, and indeed, a treating device for treating a video head and/or drum of a video recorder and/or playback unit which does not include a cleaning tape, and in which entanglement of the cleaning brush or other treating means and the carrier arm with the tape withdrawal rollers and other moveable components within a video recorder and/or playback unit is avoided, and which does not require the provision of a timing mechanism.

The present invention is directed towards providing such a treating device for treating the video head and/or rotating drum of a video recorder and/or playback unit.

According to the invention there is provided a treating device for treating the video head and/or rotating drum of a video recorder and/or playback unit, the device comprising a locating means for locating the device in a cassette receiving area of the video recorder and/or playback unit, a carrier means for carrying a treating means for treating the head and/or drum, the carrier means being mounted on the locating means and being moveable between a retracted position within the cassette receiving area when the device is located therein and a treating position with the treating means in treating association with the head and/or drum, wherein the retaining means is provided for retaining the carrier means in the retracted position, the retaining means being responsive to the locating means being entered into the cassette receiving area for releasing the carrier means from the retracted position, and an abutment means is provided associated with the carrier means for co-operating with a component in the cassette receiving area in the video unit for retaining the carrier means in the retracted position while the component is in the cassette receiving area, the abutment means being responsive to movement of the component from the cassette receiving area for permitting movement of the carrier means into the treating position.

Preferably, the retaining means is adapted for retaining the carrier means in the retracted position while the locating means is being entered into the cassette receiving area until the abutment means is aligned with the component in the cassette receiving area for engagement thereof.

Advantageously, the retaining means is responsive to the locating means progressively being entered into the cassette receiving area for progressively releasing the carrier means from the retracted position.

In one embodiment of the invention the component in the cassette receiving area with which the abutment means is engageable is a tape withdrawal roller for withdrawing a magnetic tape of a video cassette from the video cassette into engagement with the rotating drum.

In another embodiment of the invention an urging means is provided for urging the carrier means from the retracted position to the treating position. Preferably, the retaining means acts against the urging means for retaining the carrier means in the retracted position.

In one embodiment of the invention the urging means comprises a resilient urging means. Preferably, the resilient urging means comprises a torsion spring.

In one embodiment of the invention the carrier means comprises an elongated carrier arm. Preferably, the carrier arm is pivotally mounted on the locating means, and is pivotal between the retracted and the treating positions. Advantageously, the carrier arm extends between a pivot mounting means for pivotally mounting the carrier arm on the locating means and a connecting means spaced apart from the pivot mounting means for connecting the treating means to the carrier arm.

In one embodiment of the invention the abutment means is located on the carrier arm.

In another embodiment of the invention the abutment means is located on the carrier arm intermediate the pivot mounting means and the connecting means. Preferably, the abutment means is spaced apart from both the pivot mounting means and the connecting means. Advantageously, the abutment means is an elongated abutment means extending along the carrier arm.

In one embodiment of the invention the abutment means is formed by a side edge of the carrier arm.

In another embodiment of the invention a treating means is mounted on the connecting means of the carrier arm. Preferably, the treating means is pivotally mounted on the connecting means. Advantageously, a support means is pivotally connected to the connecting means of the carrier arm for pivotally carrying the treating means.

In one embodiment of the invention the treating means is a cleaning means. Advantageously, the treating means comprises a cleaning brush. Preferably, the cleaning brush comprises a support base and a plurality of cleaning fibres extending from the support base, the support base being engageable with the support means. Advantageously, the support base of the cleaning means is releasably engageable with the support means.

In one embodiment of the invention the retaining means is pivotally connected to the locating means, and is pivotal between a retaining position for retaining the carrier means in the retracted position and a release position for releasing the carrier means from the retracted position.

In another embodiment of the invention the abutment means is located adjacent the locating means for engaging the component in the cassette receiving area as the device is being entered into the cassette receiving area.

In a further embodiment of the invention the locating means comprises a base member defining the cassette receiving area of the video recorder and/or playback unit for locating the treating device in the receiving area.

In another embodiment of the invention the locating means comprises a housing of which the base member forms a part, the housing defining a hollow interior region for accommodating the carrier means and the treating means. Preferably, the housing is of size and shape substantially similar to a video cassette housing of a magnetic video tape cassette. Advantageously, the base member of the housing forms a base wall thereof, and a top wall is provided spaced apart above the base wall, the base and top walls terminating in front edges which in use face towards the drum, the front edges of the respective top and base walls defining a forward plane within which a forward opening is provided to the hollow interior region. Preferably, the carrier means is pivotal from the retracted position with the treating means located within the housing internally of the forward plane to the treating position with the treating means externally through the forward opening and externally of the forward plane.

In one embodiment of the invention a lid is pivotally connected to the housing for closing the forward opening, the lid being pivotal from an open position exposing the forward opening to a closed position with the forward opening closed. Advantageously, the retaining means is mounted on the lid, and is moveable between the retaining position and the release position as the lid is pivoted between the closed position and the open position, respectively. Preferably, when the lid is in the closed position the retaining means extends inwardly into the housing through the forward opening. Advantageously, the lid is pivotal from the closed to the open position in response to the treating device being entered into the cassette receiving area.

In one embodiment of the invention the retaining means is co-operable with the treating means for retaining the carrier means in the retracted position.

In a further embodiment of the invention the abutment means is engageable with the component in the cassette receiving area as the locating means is being lowered into the cassette receiving area.

Further, the invention provides a method for treating a video head and/or rotating drum of a video recorder and/or playback unit using a treating device which comprises a locating means for locating the device in a cassette receiving area of the video recorder and/or playback unit, and a carrier means for carrying a treating means for treating the head and/or drum, the method comprising the steps of placing the locating means in the cassette receiving area of the video recorder and/or playback unit for locating the device in the cassette receiving area, and urging the carrier means into a treating position with the treating means positioned for treating the video head and/or drum, wherein the carrier means is retained in a retracted position in the cassette receiving area until an abutment means associated with the carrier means is aligned with a component in the cassette receiving area, and releasing the carrier means so that the abutment means engages the component for retaining the carrier means in the retracted position until the component commences to move from the cassette receiving area.

Figure 2:
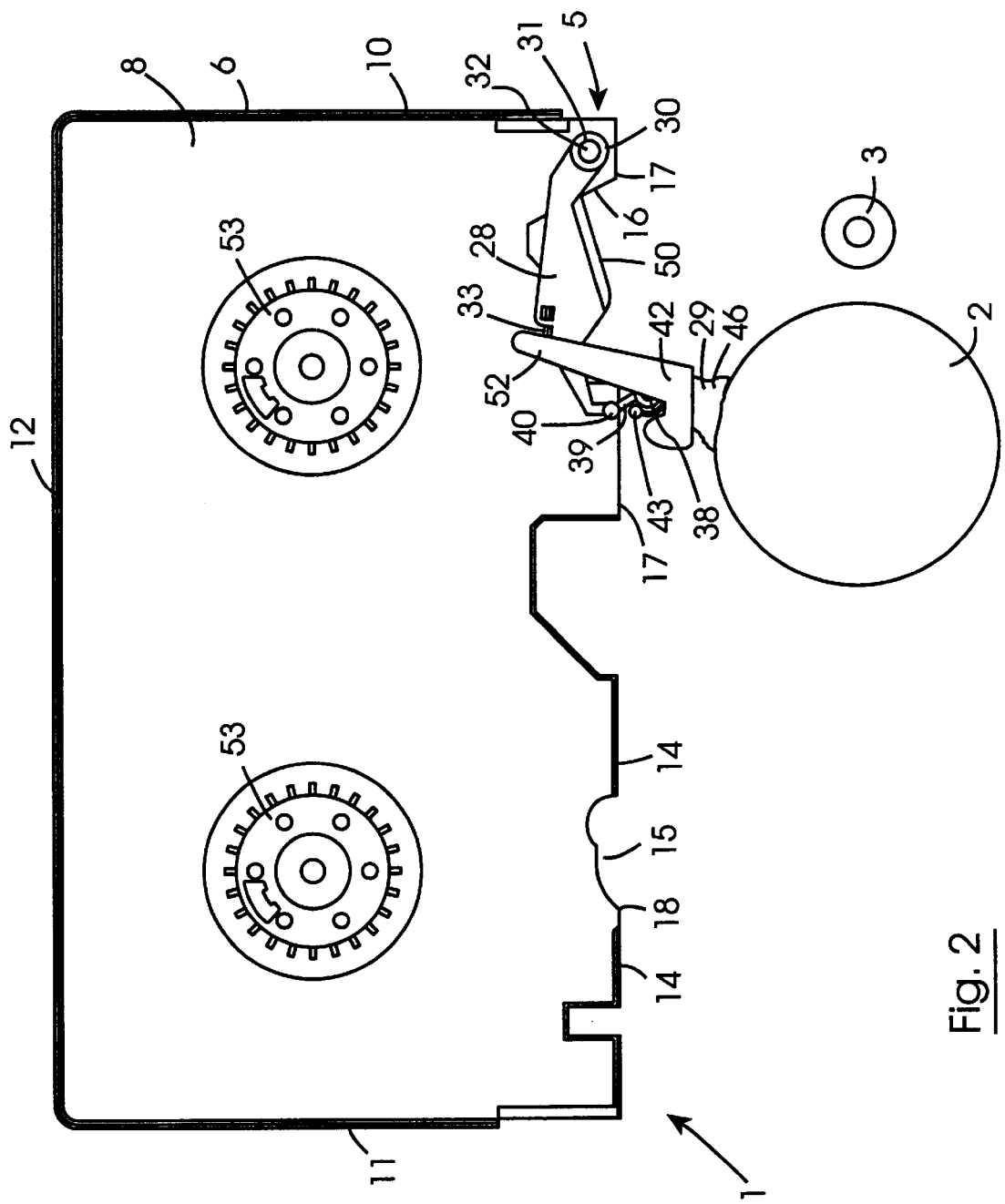
Figure 3:
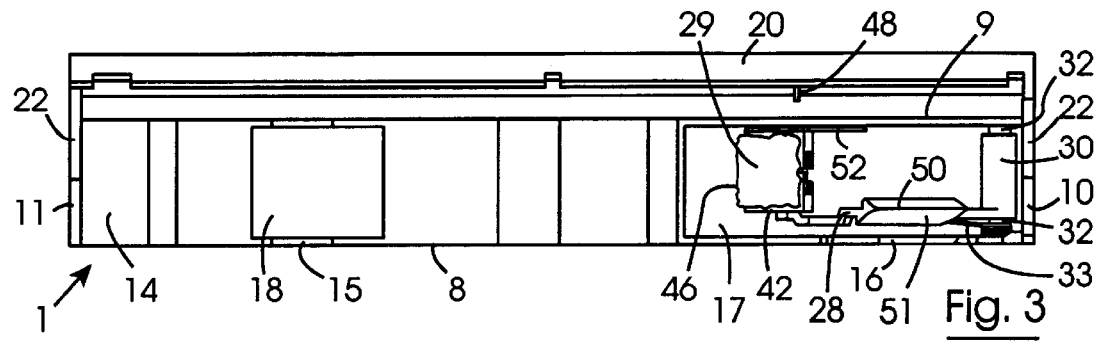
Figure 4:
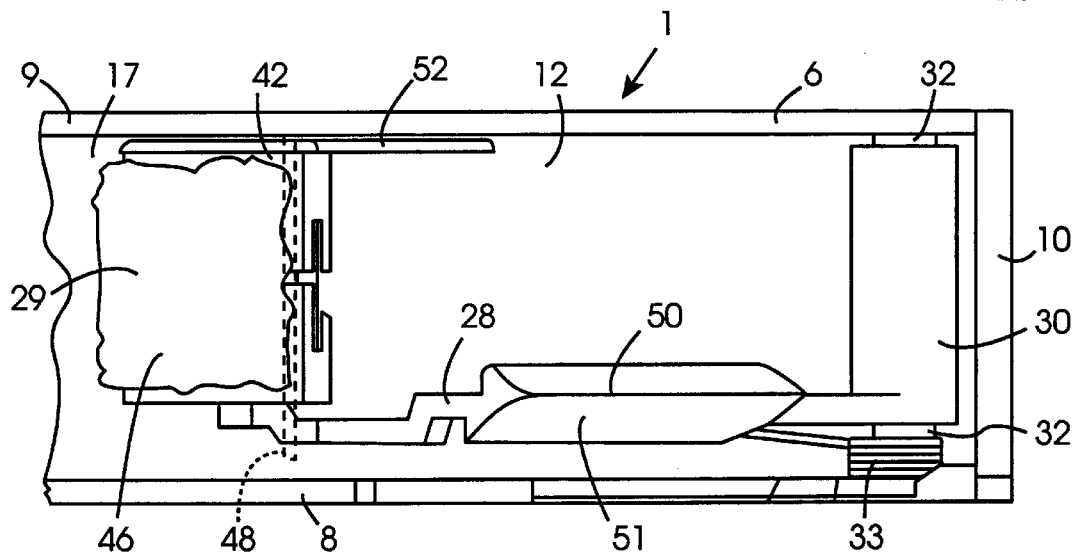
Figure 7:
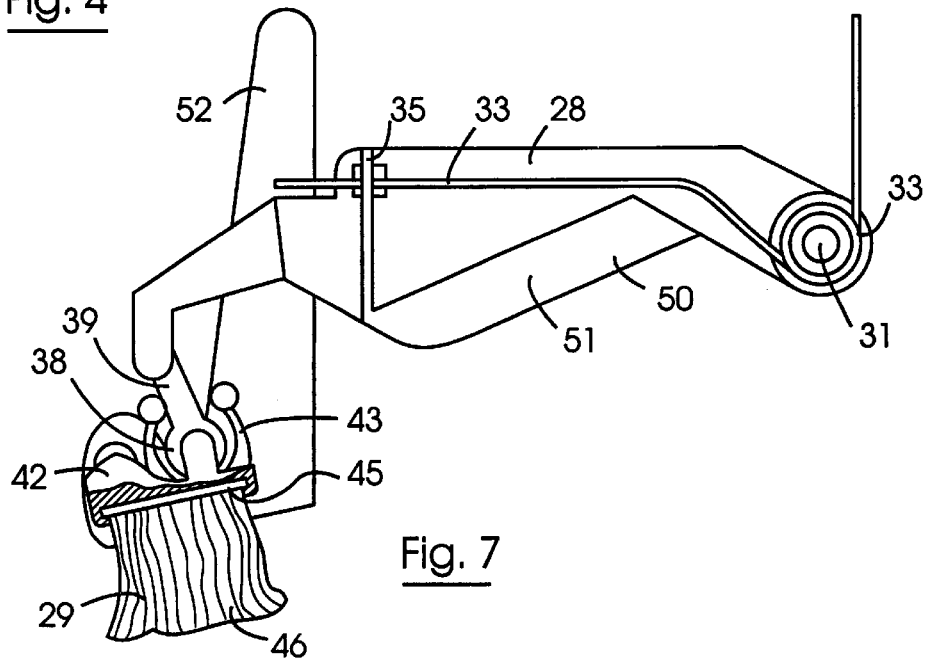
Figure 5:
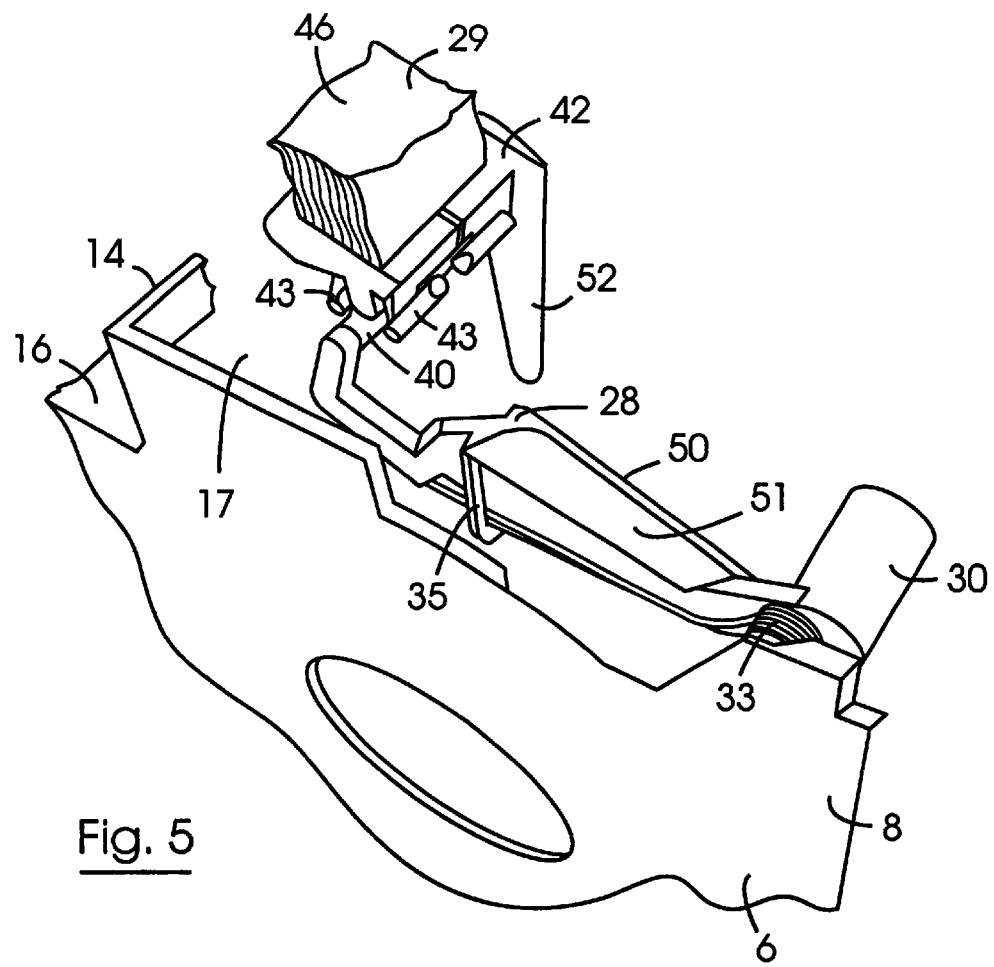
Figure 6:
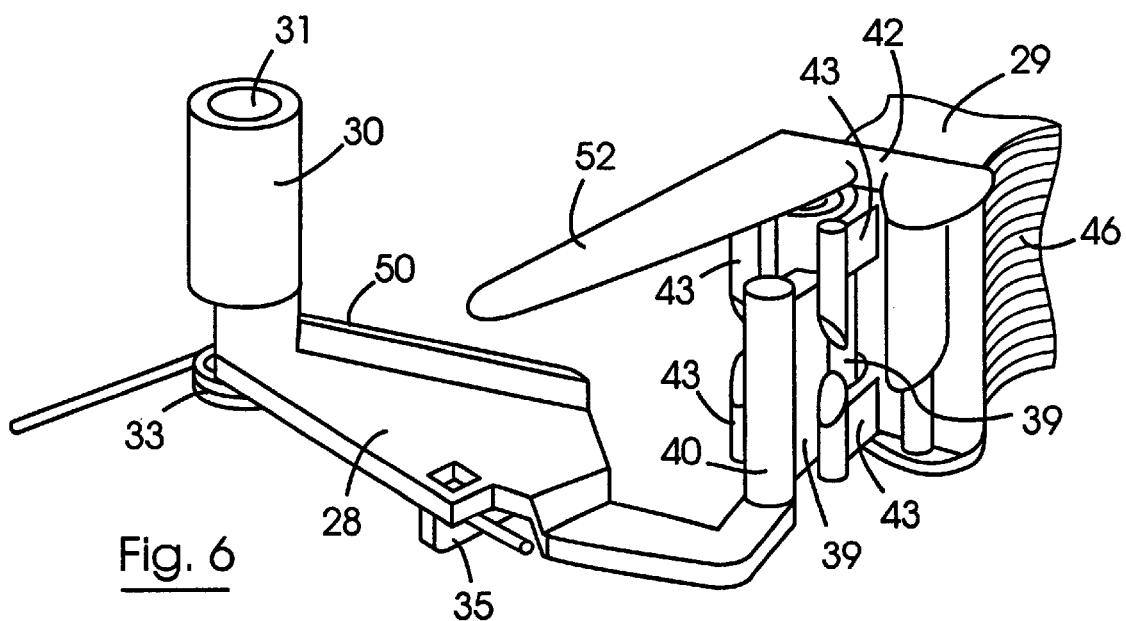
Figure 9:
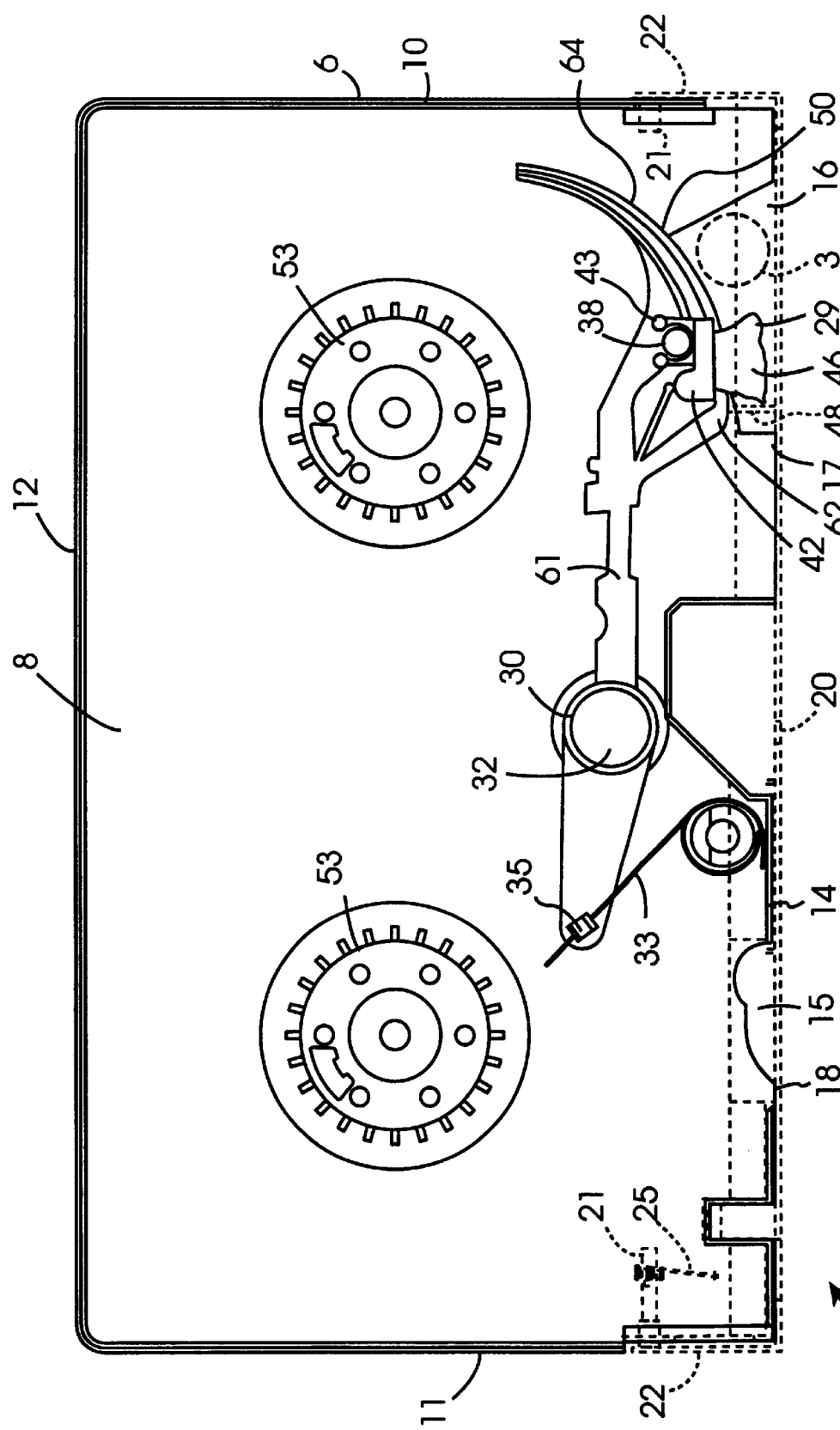
Figure 10:
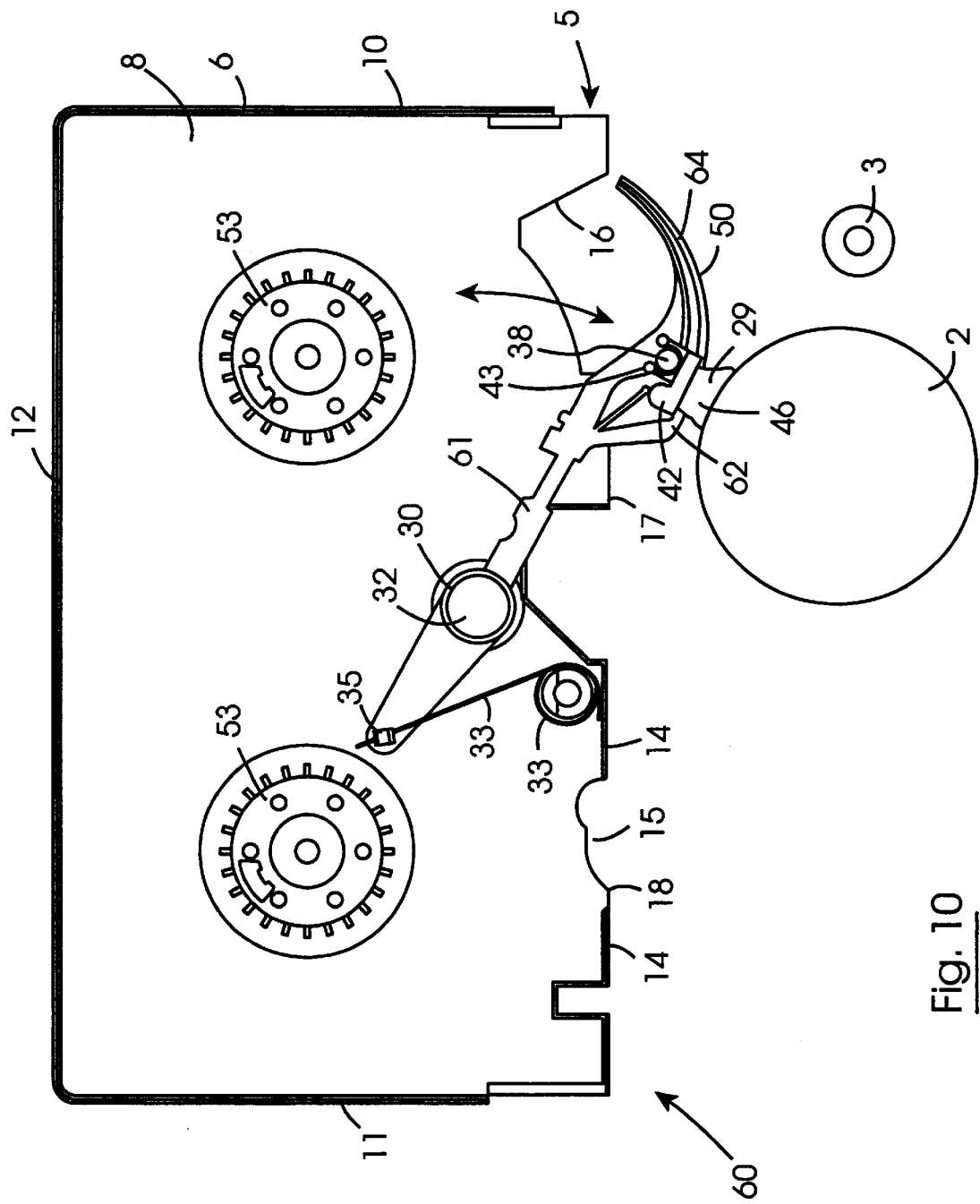

The invention will be more clearly understood from the following description of some preferred embodiments thereof, which are given by way of example only, with reference to the accompanying drawings, in which:

FIG. 1 is a top plan view of a treating device according to the invention for cleaning a video head and drum of a video recorder and/or playback unit, FIG. 2 is a top plan view of the treating device of FIG. 1 illustrated in use, FIG. 3 is a front elevational view of the treating device of FIG. 1, FIG. 4 is an enlarged front elevational view of a portion of the treating device of FIG. 1, FIG. 5 is an underneath perspective view of a portion of the treating device of FIG. 1, FIG. 6 is a perspective view of a detail of the treating device of FIG. 1, FIG. 7 is an underneath plan view of the detail of FIG. 6, FIGS. 8(a) to (c) are cross-sectional end elevational views of a portion of the treating device of FIG. 1 illustrating the portions in different positions during use of the treating device, FIG. 9 is a view similar to FIG. 1 of a treating device according to another embodiment of the invention, FIG. 10 is a view similar to FIG. 2 of the treating device of FIG. 9, FIG. 11 is a cross-sectional side elevational view of a portion of the treating device of FIG. 9, FIG. 12 is a front perspective view of a portion of the treating device of FIG. 9, FIG. 13 is a top plan view of a detail of the treating device of FIG. 9, and FIGS. 14(a) to (c) are front elevational views of a portion of the treating device of FIG. 9 illustrated in different positions in use, with a front wall of the device removed.

Referring to the drawings, and initially to FIGS. 1 to 8, there is illustrated a treating device according to the invention indicated generally by the reference numeral 1 for treating, in this embodiment of the invention, for cleaning the video head and rotating drum of a video recorder and/or playback unit. Only the rotating drum and one tape withdrawal roller of the video unit is illustrated in FIG. 2, the rotating drum being indicated by the reference numeral 2, and the tape roller being indicated by the reference numeral 3. The video head, which is not illustrated, is located in the video drum 2, as will be well known to those skilled in the art. Indeed, such video recorder and/or playback units will be well known to those skilled in the art, and it is not intended to describe or illustrate other components of the video unit. The tape withdrawal roller 3 along with other tape withdrawal rollers, typically are mounted on respective arms (not shown) which are operable for urging the tape withdrawal roller from a position within a cassette receiving area 5 of the video unit as is illustrated in FIG. 2 for engaging behind a magnetic tape of a typical video tape cassette for withdrawing the magnetic tape from the video tape cassette outwardly into engagement with the drum 2. The magnetic tape is returned into the video tape cassette as the tape withdrawal rollers are similarly returned to the cassette receiving area 5. A sufficient number of tape withdrawal rollers is provided for urging the video tape from the video tape cassette into engagement with the drum so that the video tape engages approximately 180° of the circumference of the drum 2.

The treating device 1 comprises a housing 6 of shape and size similar to a cassette housing of a video tape cassette housing, and thus acts as a locating means for locating the treating device 1 in the cassette receiving area 5. The housing 6 comprises a base member, namely, a base wall 8 and a spaced apart top wall 9, which are joined by a pair of end walls 10 and 11 extending between the base and top walls 8 and 9. A rear wall 12 extends between the base and top walls 8 and 9 and joins the end walls 10 and 11. A front wall 14 extending between the base and top walls 8 and 9 also extends between the end walls 10 and 11. The front wall 14 defines a forward plane which faces towards the drum 2 when the housing 6 is entered in the cassette receiving area 5. Recesses 15 and 16 are formed in the front wall 14 and the base wall 8 for accommodating the roller 3 and the other tape withdrawal rollers (not shown) in the tape receiving area 5. Two openings 17 and 18 are provided in the front wall 14 which are substantially similar to corresponding openings in a video tape cassette, and the opening 17 is provided for a specific function which will be described below.

A lid 20 which is similar to a lid of a video tape cassette housing is pivotally mounted on the housing 6 by pivot pins 21 which extend from side members 22 of the lid 20 and engage corresponding pivot pin engaging openings (not shown) in the adjacent end walls 10 and 11. The pivotal mounting of the lid 20 is identical to that of the mounting of a lid to a cassette housing of a video tape cassette, and is urged from a closed position closing the openings 17 and 18 as illustrated in FIG. 8(a) to an open position illustrated in FIG. 8(c) as the housing 6 is being lowered into the cassette receiving area 5 of the video recorder and/or playback unit as would be the case with a lid of a video tape cassette. A biasing means, namely, a biasing torsion spring 25 located on one of the pivot pins 21 acts between the top wall 9 and the adjacent side member 22 for urging the lid 20 into the closed position.

A carrier means comprising an elongated carrier arm 28 which is pivotally mounted in the housing 6 carries a treating means, namely, a cleaning brush 29 for cleaning the video head and drum 2. The carrier arm 28 is pivotal between a retracted position within the housing 6, and thus within the cassette receiving area 5 with the cleaning brush 29 also within the housing 6 and a treating position with the cleaning brush 29 in engagement with the video head and drum 2 for cleaning thereof. The opening 17 in the front wall 14 accommodates movement of the carrier arm 28 and the cleaning brush 29 between the retracted and treating positions through the opening 17 in the front wall 14. One end of the carrier arm 28 terminates in a pivotal mounting means, namely, a boss 30 having a bore 31 extending therethrough and through the carrier arm 28 for engaging a pivot pin 32, which extends between the base and top walls 8 and 9 adjacent the end wall 10. An urging means comprising an urging torsion spring 33 carried on the pivot pin 32 acts between the end wall 10 and the carrier arm 28 for urging the carrier arm 28 from the retracted position to the treating position. A clip 35 on the carrier arm 28 engages one end of the torsion spring 33, while the other end of the torsion spring 33 engages the end wall 10.

The other end of the carrier arm 28 terminates in a connecting means provided by a pivot connector 38 for pivotally mounting the cleaning brush 29 to the carrier arm 28. A connecting web 39 which extends from an upstanding member 40 extending upwardly from the carrier arm 28 connects the pivot connector 38 to the carrier arm 28. A support means, namely, a support member 42 which is pivotally carried on the pivot connector 38 carries the cleaning brush 29. Pivot mounting brackets 43 extending rearwardly from the support member 42 engage the pivot connector 38 with a snap fit action for facilitating replacement of the support member 42 and the cleaning brush 29. Additionally, the pivot mounting brackets 43 relatively loosely engage the pivot connector 38 for facilitating limited universal movement of the support member 42 relative to the pivot connector 38 for facilitating alignment of the cleaning brush 29 with the drum 2 for in turn ensuring snug cleaning engagement of the cleaning brush 29 with the drum 2. The cleaning brush 29 comprises a base member 45 which is releasably secured in the support member 42, and cleaning fibres 46 extend from the base member 45 for cleaning the video head and drum.

A retaining means for releasably retaining the carrier arm 28 and the cleaning brush 29 in the retracted position comprises a retaining rib 48 which extends inwardly from the lid 20 through the opening 17 for engaging the support member 42, and in turn, for retaining the support member 42 and the carrier arm 28 along with the cleaning brush 29 in the retracted position. The retaining rib 48 is of width W such that as the housing 6 is being lowered into the cassette receiving area 5, and the lid 20 engages a corresponding part 49 of the video recorder and/or playback unit adjacent the cassette receiving area 5 for pivoting the lid 20 from the closed to the open position, the carrier arm 28 is only slowly and progressively released from the retracted position, and is not fully released to pivot into the treating position until the lid 20 has been pivoted from the closed to the open position through an angle of approximately 45°, see FIGS. 8(a) to (c). Additionally, the width W of the retaining rib 48 is sufficient for spacing the support member 42 away from the lid 20 for avoiding crushing of the fibres 46 of the cleaning brush 29 against the lid 20. The biasing moment induced in the lid 20 by the biasing torsion spring 25 for urging the lid 20 into the closed position is greater than the moment induced in the carrier arm 28 by the urging torsion spring 33 for urging the carrier arm 38 into the treating position, so that when the lid 20 is in the closed position the cleaning brush 29 and the carrier arm 28 are retained by the retaining rib 48 in the retracted position.

An abutment means which is formed by an abutment edge 50 on the carrier arm 28 is provided for abutting the tape withdrawal roller 3 so that the carrier arm 28, and in turn, the cleaning brush 29 is retained within the cassette receiving area 5 until the tape withdrawal roller 3 commences to move from the cassette receiving area 5. The relationship between the width W of the retaining rib 48, the support member 42 and the abutment edge 50 is such that the retaining rib 48 co-operates with the support member 42 as the housing 6 is being lowered into the cassette receiving area 5 and the lid 20 is being pivoted from the closed to the open position, for retaining the carrier arm 28 in the retracted position sufficiently within the housing 6 until the abutment edge 50 on the carrier arm 28 comes into alignment with the tape withdrawal roller 3, see FIGS. 8(a) to (c). Thus, on disengagement of the support member 42 by the retaining rib 48 the carrier arm 28 is released to pivot into the treating position, and as the carrier arm 28 commences to pivot from the retracted position, the abutment edge 50 moves into engagement with the tape withdrawal roller 3, which in turn retains the carrier arm 28 in the cassette receiving area 5 until the tape withdrawal roller 3 commences to move from the cassette receiving area 5. In this way the carrier arm 28 and the cleaning brush 29 are retained in the cassette receiving area 5 until the tape withdrawal roller 3 and the other tape withdrawal roller (not shown) have moved from the cassette receiving area 5, thereby preventing any danger of the carrier arm 28 and the cleaning brush 29 becoming entangled with or impaled on the tape withdrawal rollers.

The boss 30 extends upwardly from the carrier arm 28, and is length such that the carrier arm 28 is located relatively close to the base wall 8 so that shortly after commencement of downward movement of the housing 6 into the cassette receiving area 5 as the housing 6 is being loaded into the cassette receiving area 5, the abutment edge 50 on the carrier arm 28 comes into alignment with the tape withdrawal roller 3 behind the tape withdrawal roller 3. The abutment edge 50 is chamfered at 51 for providing a lead-in surface to the tape withdrawal roller 3 in the event that the abutment edge 50 should extend slightly over the tape withdrawal roller 3 as the housing 6 is being lowered into the cassette receiving area 5. Thus, should the lead-in surface 51 commence to engage the tape withdrawal roller 3 as the housing 6 is being lowered into the cassette receiving area 5, the carrier arm 28 is urged behind the tape withdrawal roller 3.

A lead-in means comprising a lead-in member 52 extending rearwardly from the support member 42 leads the support member 42 and in turn the cleaning brush 29 into the housing 6 when the cleaning brush 29 is returning from the treating position to the retracted position within the housing 6. The lead-in member 52 slideably engages the top wall 9 within the housing 6 for leading the support member 42 into the housing 6, and is of sufficient length that even when the cleaning brush 29 and the support member 42 are in the treating position, the lead-in member 52 remains in sliding engagement with the top wall 9 within the housing 6. Thereby, any danger of the support member 42 or the cleaning brush 29 snagging on the top wall 9 as the support member 42 and the cleaning brush 29 are returning to the retracted position is avoided.

A pair of spools 53 which are similar to tape spools of a conventional video tape cassette are rotatably carried in the housing 6 for alignment with drive and take-up spindles of the video unit. The spools assist in alignment of the housing in the cassette receiving area, but have no other specific function, and in many cases may be dispensed with.

In use, with the lid 20 in the closed position retaining the carrier arm 28 and the cleaning brush 29 in the retracted position, the treating device 1 is loaded into a video recorder and/or playback unit as would a conventional video tape cassette be loaded. As the housing 6 is being lowered into the cassette receiving area 5 with the tape withdrawal rollers 3 in their normal inactive position within the cassette receiving area 5, the lid 20 is engaged by the part 49 of the video recorder and/or playback unit, see FIG. 8(a). Further lowering of the housing 6 into the cassette receiving area 5 causes the lid 20 to be pivoted from the closed position towards the open position by the part 49, see FIG. 8(b). As the housing 6 continues to be lowered into the cassette receiving area 5, the abutment edge 50 of the carrier arm 28 begins to align behind the tape withdrawal roller 3, and is retained behind the tape withdrawal roller 3 by the action of the retaining rib 48 on the support member 42, see FIG. 8(b). Further downward movement of the housing 6 in the cassette receiving area 5 causes the lid 20 to be further pivoted from the closed to the open position, thereby progressively but slowly releasing the carrier arm 28 from the retracted position until the abutment edge 50 of the carrier arm 28 engages the tape withdrawal roller 3. Further downward movement of the housing 6 into the cassette receiving area 5 causes the lid 20 to pivot beyond 45° from its closed position, thereby causing the retaining rib 48 to disengage the support member 42, and thus, releasing the carrier arm 28, see FIG. 8(c). However, at this stage the abutment edge 50 is in engagement with the tape withdrawal roller 3, thus retaining the carrier arm 28 and the cleaning brush 29 substantially in the retracted position. As the video recorder and/or playback unit commences to go into a play mode, the tape withdrawal roller 3 commences to move outwardly from the cassette receiving area 5, thereby permitting the carrier arm 28 to follow the tape withdrawal roller 3, and thus permitting pivoting of the carrier arm 28 and the cleaning brush 29 into the treating position under the action of the urging torsion spring 33. The cleaning brush 29 is thus urged into snug cleaning engagement with the drum 2, and in turn the video head.

When it is determined that the drum 2 and the video head have been adequately cleaned, the video recorder and/or playback unit can be put into a stop mode which thus causes the tape withdrawal roller 3 to return along with the other tape withdrawal rollers (not shown) to the cassette receiving area 5. The tape withdrawal roller 3 thus engages the abutment edge 50 on the carrier arm 28 as it is returning to the cassette receiving area 5 for urging the carrier arm 28 back into the retracted position. The tape withdrawal roller 3 bearing on the abutment edge 50 of the carrier arm 28 continues to retain the carrier arm 28 in the retracted position while the housing 6 is in the cassette receiving area 5. As the housing 6 is being urged upwardly in the cassette receiving area 5 for ejecting the housing 6 therefrom, the lid 20 commences to pivot from the open to the closed position, thereby causing the retaining rib 48 to engage the support member 42 for retaining the carrier arm 28 in the retracted position prior to the abutment edge 50 of the carrier arm 28 disengaging the tape withdrawal roller 3 as the housing 6 is being urged upwardly in the cassette receiving area 5. This is the reverse of the movement illustrated with reference to FIGS. 8(a) to (c).

Accordingly, the treating device 1 achieves the objective of the invention of retaining the carrier arm 28 and the cleaning brush 29 in a retracted position while the tape withdrawal rollers 3 are in the cassette receiving area 5, and furthermore, the relationship between the retaining rib 48 and the abutment edge 50 ensure that the carrier arm 28 and the cleaning brush 29 do not leave the cassette receiving area until the tape withdrawal roller 3, and indeed the other tape withdrawal rollers 3, commence outward movement from the cassette receiving area 5. Additionally, the provision of the abutment edge 50 on the carrier arm 28 ensures that the carrier arm 28 and the cleaning brush 29 are returned to the cassette receiving area 5 by the tape withdrawal roller 3 and thus prior to the return of the tape withdrawal roller 3 and the other tape withdrawal rollers to the cassette receiving area 5 after cleaning of the video head and drum. Additionally, the relationship between the retaining rib 48 and the abutment edge 50 ensure that there is no danger of the carrier arm 28 and/or the cleaning brush 29 moving from the retracted position as the housing 6 is being ejected from the cassette receiving area 5.

Referring now to FIGS. 9 to 14, there is illustrated a treating device according to another embodiment of the invention indicated generally by the reference numeral 60 also for treating, in this embodiment of the invention, cleaning a video head and drum of a video recorder and/or playback unit. The device 60 is substantially similar to the device 1 and similar components are identified by the same reference numerals. The main difference between the treating device 60 and the treating device 1 is in the construction and mounting of the carrier arm, which in this embodiment of the invention is indicated by the reference numeral 61.

The carrier arm 61 is pivotally mounted within the housing 6 substantially midway between the end walls 10 and 11 and is urged by an urging torsion spring 33 from the retracted position illustrated in FIG. 9 to a treating position illustrated in FIG. 10 for cleaning the video head and drum. The retaining rib 48 on the lid 20 engages a leaf 62 extending from the carrier arm 61 for retaining the carrier arm 61, and in turn, the cleaning brush 29 in the retracted position. In this embodiment of the invention the abutment means is provided by an arcuate abutment member 64 which extends from the carrier arm 28 for engaging the tape withdrawal roller 3. The arcuate abutment member 64 is located relatively close to the base wall 8 for facilitating alignment of the abutment member 64 with the tape withdrawal roller 3 shortly after the housing 6 commences to be lowered into the cassette receiving area 5.

Otherwise, the treating device 60 is similar to the treating device 1 and its operation is likewise similar to that of the treating device 1.

While the retaining means has been described as being provided by a retaining rib mounted on the lid of the housing, it is envisaged in certain cases that the lid may act directly on the cleaning brush or other treating means or on the carrier arm for retaining the carrier arm in the retracted position.

While the treating means has been described as being a cleaning means, any other suitable treating means for treating the video head and/or drum of a video recorder and/or playback unit may be provided instead of or as well as a cleaning means, for example, a buffing means may be provided for buffing the video head and/or drum.

While the urging means for urging the carrier arm between the retracted and the treating positions has been described as being a torsion spring, any other suitable urging means may be provided.

What is claimed is:

1. A treating device for treating the video head and/or rotating drum (2) of a video recorder and/or playback unit, the device (1) comprising a locating means (6) for locating the device (1) in a cassette receiving area (5) of the video recorder and/or playback unit, a carrier means (28, 61) for carrying a treating means (29) for treating the head and/or drum (2), the carrier means (28, 61) being mounted on the locating means (6) and being moveable between a retracted position within the cassette receiving area (5) when the device (1) is located therein and a treating position with the treating means (29) in treating association with the head and/or drum (2), a retaining means (48) for retaining the carrier means (28, 61) in the retracted position, the retaining means (48) being responsive to the locating means (6) being entered into the cassette receiving area (5) for releasing the carrier means (28, 61) from the retracted position, and an abutment means (50, 64) associated with the carrier means (28, 61) for co-operating with a component (3) in the cassette receiving area (5) in the video unit, and being responsive to movement of the component (3) from the cassette receiving area (5) for permitting movement of the carrier means (28, 61) into the treating position characterised in that the retaining means (48) and the abutment means (50,64) are co-operable for preventing the carrier means (28, 61) leaving the cassette receiving area (5) until the component (3) commences outward movement from the cassette receiving area (5) and for preventing the carrier means (28, 61) from moving from the retracted position as the locating means (6) is being ejected from the cassette receiving area (5).

2. A treating device as claimed in claim 1 characterised in that the retaining means (48) is adapted for retaining the carrier means (28, 61) in the retracted position while the locating means (6) is being entered into the cassette receiving area (5) until the abutment means (50, 64) is aligned with the component (3) in the cassette receiving area (5) for engagement thereof.

3. A treating device as claimed in claim 1 characterised in that the retaining means (48) is responsive to the locating means (6) progressively being entered into the cassette receiving area (5) for progressively releasing the carrier means (28, 61) from the retracted position.

4. A treating device as claimed in claim 1 characterised in that the component (3) in the cassette receiving area (5) with which the abutment means (50, 64) is engageable is a tape withdrawal roller (3) for withdrawing a magnetic tape of a video cassette from the video cassette into engagement with the rotating drum (2).

5. A treating device as claimed in claim 1 characterised in that an urging means (33) is provided for urging the carrier means (28, 61) from the retracted position to the treating position.

6. A treating device as claimed in claim 1 characterised in that the carrier means (28, 61) comprises an elongated carrier arm (28, 61).

7. A treating device as claimed in claim 6 characterised in that the carrier arm (28, 61) is pivotally mounted on the locating means (6), and is pivotal between the retracted and the treating positions.

8. A treating device as claimed in claim 6 characterised in that the abutment means (50, 64) is located on the carrier arm (28, 61).

9. A treating device as claimed in claim 8 characterised in that the abutment means (50, 64) is an elongated abutment means (50, 64) extending along the carrier arm (28, 61).

10. A treating device as claimed in claim 7 characterised in that the treating means (29) is pivotally mounted on the carrier arm (28, 61).

11. A treating device as claimed in claim 10 characterised in that a support means (42) is pivotally connected to of the carrier arm (28, 61) for pivotally carrying the treating means (29).

12. A treating device as claimed in claim 11 characterised in that the treating means (29) comprises a cleaning brush (29).

13. A treating device as claimed in claim 1 characterised in that the retaining means (48) is pivotally connected to the locating means (6), and is pivotal between a retaining position for retaining the carrier means (28, 61) in the retracted position and a release position for releasing the carrier means (28, 61) from the retracted position.

14. A treating device as claimed in claim 1 characterised in that the abutment means (50, 64) is located adjacent the locating means (6) for engaging the component (3) in the cassette receiving area (5) as the device (1) is being entered into the cassette receiving area (5).

15. A treating device as claimed in claim 1 characterised in that the locating means (6) comprises a base member (8) defining the cassette receiving area (5) of the video recorder and/or playback unit for locating the treating device (1) in the receiving area (5).

16. A treating device as claimed in claim 15 characterised in that the locating means (6) comprises a housing (6) of which the base member (8) forms a part, the housing (6) defining a hollow interior region for accommodating the carrier means (28, 61) and the treating means (29), the housing (6) being of size and shape substantially similar to a cassette housing of a magnetic video tape cassette, the base member (8) of the housing (6) forming a base wall (8) thereof, and a top wall (9) being provided spaced apart above the base wall (8), the base and top walls (8, 9) terminating in front edges which in use face towards the drum, the front edges of the respective top and base walls (8, 9) defining a forward plane (14) within which a forward opening (17) is provided to the hollow interior region, and the carrier means (28, 61) is pivotal from the retracted position with the treating means (29) located within the housing (6) internally of the forward plane (14) to the treating position with the treating means (29) externally through the forward opening (17) and externally of the forward plane (14).

17. A treating device as claimed in claim 16 characterised in that a lid (20) is pivotally connected to the housing (5) for closing the forward opening (17), the lid (20) being pivotal from an open position exposing the forward opening (17) to a closed position with the forward opening (17) closed, the retaining means (48) being mounted on the lid (20), and is moveable between the retaining position and the release position as the lid (20) is pivoted between the closed position and the open position.

18. A treating device as claimed in claim 1 characterised in that the retaining means (48) is co-operable with the treating means (29) for retaining the carrier means (28, 61) in the retracted position.

19. A treating device as claimed in claim 1 characterised in that the abutment means (50, 64) is engageable with the component (3) in the cassette receiving area (5) as the locating means (6) is being lowered into the cassette receiving area (5).

20. A method for treating a video head and/or rotating drum of a video recorder and/or playback unit using a treating device wherein the treating device comprises a locating means (6) for locating the device (1) in a cassette receiving area (5) of the video recorder and/or playback unit, and a carrier means (28, 61) for carrying a treating means (29) for treating the head and/or drum (2), the carrier means (28, 61) being mounted on the locating means (6) and being moveable between a retracted position within the cassette receiving area (5) when the device (1) is located therein and a treating position with the treating means (29) associated with the head and/or drum (2), a retaining means (48) for retaining the carrier means (28, 61) in the retracted position, the retaining means (48) being responsive to the locating means (6) being entered into the cassette receiving area (5) for releasing the carrier means (28, 61) from the retracted position, and an abutment means (50, 64) associated with the carrier means (28, 61) for co-operating with a component (3) in the cassette receiving area (5) in the video unit, and being responsive to movement of the component (3) from the cassette receiving area (5) for permitting movement of the carrier means (28, 61) into the treating position, the method comprising the steps of placing the locating means (6) in the cassette receiving area (5) of the video recorder and/or playback unit for locating the device (1) in the cassette receiving area (5), and releasing the carrier means (28, 61) as the locating means (6) is being entered into the cassette receiving area (5) for engaging the component (3) in the cassette receiving area (5) and permitting movement of the carrier means (28, 61) into the treating position as the component (3) moves from the cassette receiving area (5), characterised in that the method comprises the further steps of causing the retaining means (48) and the abutment means (50, 64) to co-operate for preventing the carrier means (28, 61) leaving the cassette receiving area (5) until the component (3) commences outward movement from the cassette receiving area (5), and causing the retaining means (48) and the abutment means (50, 64) to co operate for preventing movement of the carrier means (28, 61) from the retracted position as the locating means (6) is being ejected from the cassette receiving area (5).

* * * * *